(12) United States Patent
Epps et al.

(10) Patent No.: US 8,896,607 B1
(45) Date of Patent: Nov. 25, 2014

(54) INVERSE KINEMATICS FOR RIGGED DEFORMABLE CHARACTERS

(75) Inventors: Doug Epps, Novato, CA (US); Nate Reid, Novato, CA (US)

(73) Assignee: Two Pic MC LLC, Burbank, CA (US)

( * ) Notice: Subject to any disclaimer, the term of this patent is extended or adjusted under 35 U.S.C. 154(b) by 1145 days.

(21) Appl. No.: 12/475,268

(22) Filed: May 29, 2009

(51) Int. Cl.
*G06T 13/00* (2011.01)
*G06T 11/20* (2006.01)
*G06T 15/00* (2011.01)
*G09G 5/00* (2006.01)

(52) U.S. Cl.
USPC ........... 345/473; 345/474; 345/419; 345/441; 345/585; 345/619; 382/118; 382/285

(58) Field of Classification Search
None
See application file for complete search history.

(56) References Cited

U.S. PATENT DOCUMENTS

| | | | | |
|---|---|---|---|---|
| 6,016,148 A | * | 1/2000 | Kang et al. | 345/622 |
| 6,967,658 B2 | * | 11/2005 | Hunter et al. | 345/473 |
| 2003/0184544 A1 | * | 10/2003 | Prudent | 345/419 |
| 2009/0310828 A1 | * | 12/2009 | Kakadiaris et al. | 382/118 |
| 2010/0034462 A1 | * | 2/2010 | Nevatia et al. | 382/190 |

* cited by examiner

*Primary Examiner* — Tize Ma
(74) *Attorney, Agent, or Firm* — Kilpatrick Townsend Stockton LLP

(57) ABSTRACT

A method for a computer system includes receiving a surface deformation for an object from a computer system user, wherein an object model comprises animation variables used to determine the surface of the object model, determining at least one pre-defined object pose from pre-defined object poses in response to the surface deformation, wherein the predefined object poses includes a first predefined object pose and comprises animation variable values, wherein the animation variable values are determined from physical motion capture data of surface positions of a physical representation of the object posed in a first pose, posing the object model in a pose in response to at least the animation variable values, and displaying the object model in the pose on a display to the computer system user.

17 Claims, 7 Drawing Sheets

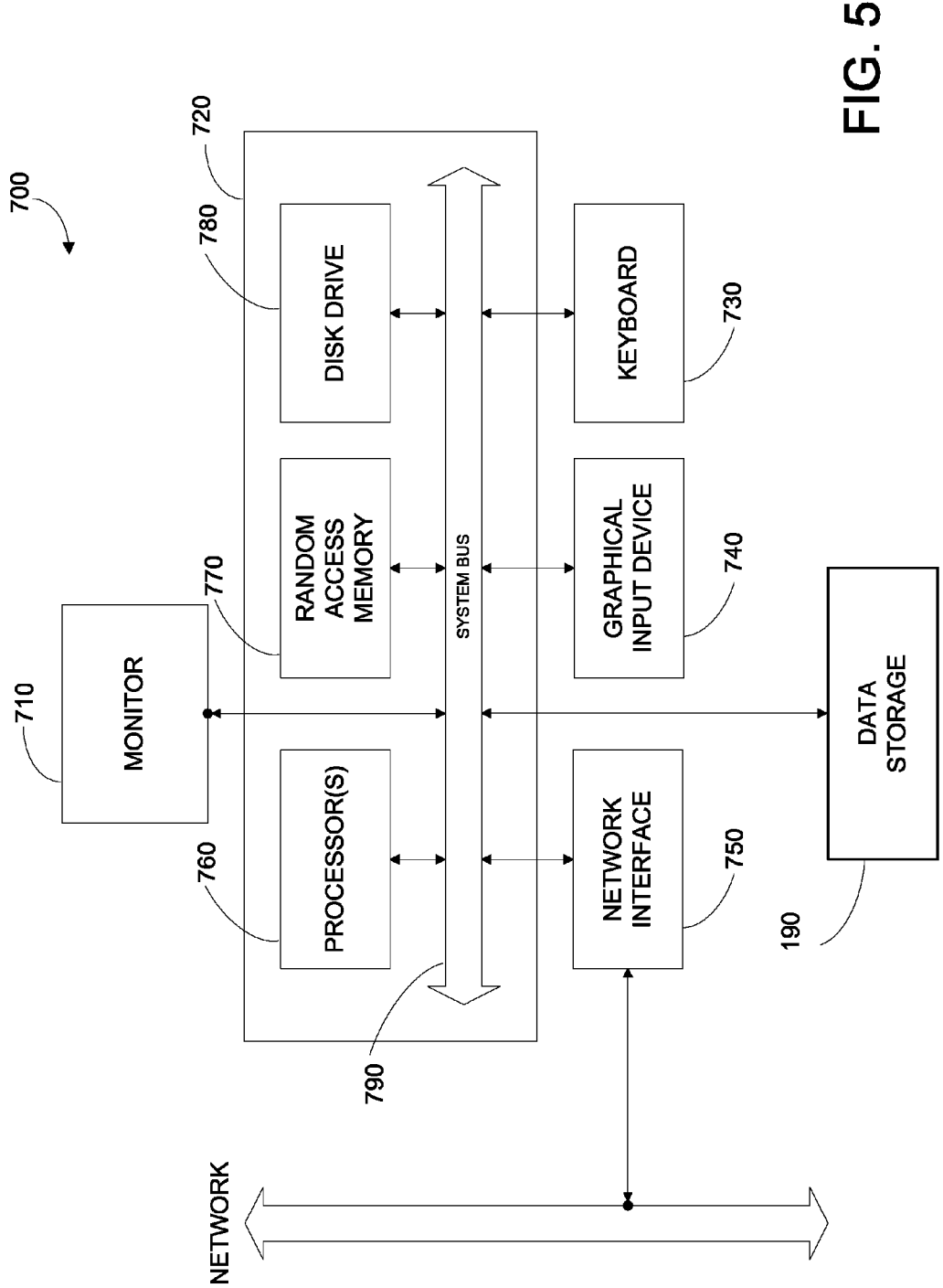

INVERSE KINEMATICS FOR RIGGED DEFORMABLE CHARACTERS

BACKGROUND OF THE INVENTION

The present invention relates to computer animation. More specifically, the present invention relates to computer animation based upon motion captured data.

In computer animation, a user, known as an animator, typically specifies poses for models of an object on a computer system. Based upon the specified poses with respect to time, the object may appear to be animated in a series of rendered images. The inventors of the present invention have recognized that specifying poses of objects via object models is a very time consuming process. As an example, a face of an animated character may have about 100 individually adjustable parameters that determine positions for 20,000 surface points. Accordingly, animation of a character's face, for example, is a slow and painstaking process.

To facilitate posing models of objects in a computer animation environment, the assignee of the present patent application, ImageMovers Digital has pioneered the use of physical motion capture techniques using live actors. By way of example, ImageMovers has used a combination of motion capture techniques and traditional computer animation techniques to produce feature-length films including: "The Polar Express" (2004), "Monster House" (2006), "Beowulf" (2007), which have garnered several Academy Award nominations.

The inventors of the present invention have recognized that although motion captured data may assist an animator in the animation process, animators still need to refine such animation, by hand. One reason for this, is that motion capture data, especially of the face of an actor, typically only provides low-resolution, wire-frame-like data, that provides very coarse animation data. Another reason, is that when motion captured data alone is used to drive computer animation, the resulting computer animation often looks stiff and not esthetically pleasing.

One problem recognized by the inventors of the present invention with animators modifying motion captured data includes, that it is very easy for an animator to pose "off-model." In other words, it may be easy for an animator to stray from desired characteristic poses. As merely an example, suppose an actor was known for having a characteristic mannerism such as a wink or a smirk, and that mannerism was motion-captured. In the animation process, the animator may start with a the motion captured mannerism, but then may ruin such poses unintentionally when refining the animation. The resulting posed model would be considered "off-model" because the object does not behave the way the actor did.

Accordingly what is desired are methods and apparatus for facilitating the use of motion captured data for computer animation, without the drawbacks described.

BRIEF SUMMARY OF THE INVENTION

The present invention relates to computer animation. More specifically, the present invention relates to computer animation based upon motion captured data.

In various embodiments of the present invention, motion capture data of an object, such as an actor's face is captured in a number of characteristic poses. Based upon this data, within the animation environment, a rigged models is determined including animation variables. Values for animation variables are selected to emulate the characteristic poses for the object. These animation variable values, along with a deformed surface are stored in a database. Subsequently, within the animation environment, when a user, such as an animator, displaces a point on the surface of the object, a determination is made as to which pose surface should be used to best represent the object. The values for the animation variables associated with the closest pose surface are then retrieved and the applied to the rigged model. Accordingly, the animator can freely deform the surface of the object, while staying "on-model," i.e. maintaining the characteristic poses and appearance of the object.

According to one aspect of the invention a method for a computer system is disclosed. One technique includes receiving a surface deformation for a surface of a model of an object from a user via a user input device of the computer system, wherein the model of the object comprises a plurality of animation variables, wherein values for the plurality of animation variables are used to determine the surface of the model. A process includes determining a predefined pose for the model of the object from a plurality of pre-defined poses for the model of the object in response to the surface deformation, wherein the plurality of predefined poses includes a first predefined pose, wherein the first predefined pose comprises a first plurality of values for the plurality of animation variables, wherein the first plurality of values for the plurality of animation variables is determined in response to physical motion capture data of surface positions of the object physically posed in a first pose. A method may include posing the model of the object in a pose in response to the first plurality of values of the plurality of animation variables, and displaying the model of the object in the pose to a user on a display of the computer system.

According to another aspect of the invention a computer system is disclosed. One apparatus may include a memory configured to store a model of an object comprising a plurality of animation variables, wherein values for the plurality of animation variables are used to determine a surface of the model of the object, and configured to store a plurality of predefined poses including a first predefined pose, wherein the first predefined pose comprises a first plurality of values for the plurality of animation variables, wherein the first plurality of values for the plurality of animation variables are determined in response to physical motion capture data of surface positions of the object physically posed in a first pose. A device may include a user input device configured to receive an input from the user, and a processor coupled to the memory and to the user input device, wherein the processor is configured to determine a surface deformation for the surface of the model of the object in response to the input from the user, wherein the processor is configured to determine the first predefined pose for the model of the object from the plurality of pre-defined poses for the model of the object in response to the surface deformation, wherein the processor is configured to pose the model of the object in a pose in response to the first plurality of values of the plurality of animation variables. A system may include a display coupled to the processor, wherein the display is configured to display the model of the object in the pose to the user.

According to yet another aspect of the invention a method for a computer program product residing on a tangible medium and executable on a computer system including a processor, a user input device and a display, is disclosed. The computer program product may include code that directs the processor to receive a surface deformation for a surface of a model of an object from a user via the user input device, wherein the model of the object comprises a plurality of animation variables, wherein values for the plurality of animation variables are used to determine the surface of the model, and code that directs the processor to determine at least a first predefined pose for the model of the object from a plurality of pre-defined poses for the model of the object in response to the surface deformation, wherein the first pre-defined pose comprises a first plurality of values for the plurality of animation variables, wherein the first plurality of values for the plurality of animation variables are determined in response to physical motion capture data of surface positions of the object physically posed in a first pose. The code my include code that directs the processor to pose the model of the object in a pose in response to the first plurality of values of the plurality of animation variables, and code that directs the processor to display the model of the object in the pose to a user on the display. The tangible medium may be optical media (e.g. DVD, CD-ROM, Blu-Ray, or the like), semiconductor media (e.g. RAM, Flash memory, or the like), magnetic media (e.g. hard disk, storage area network, or the like).

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 5 is a block diagram of typical computer system according to various embodiments of the present invention.

DETAILED DESCRIPTION OF THE INVENTION

Figure 1:
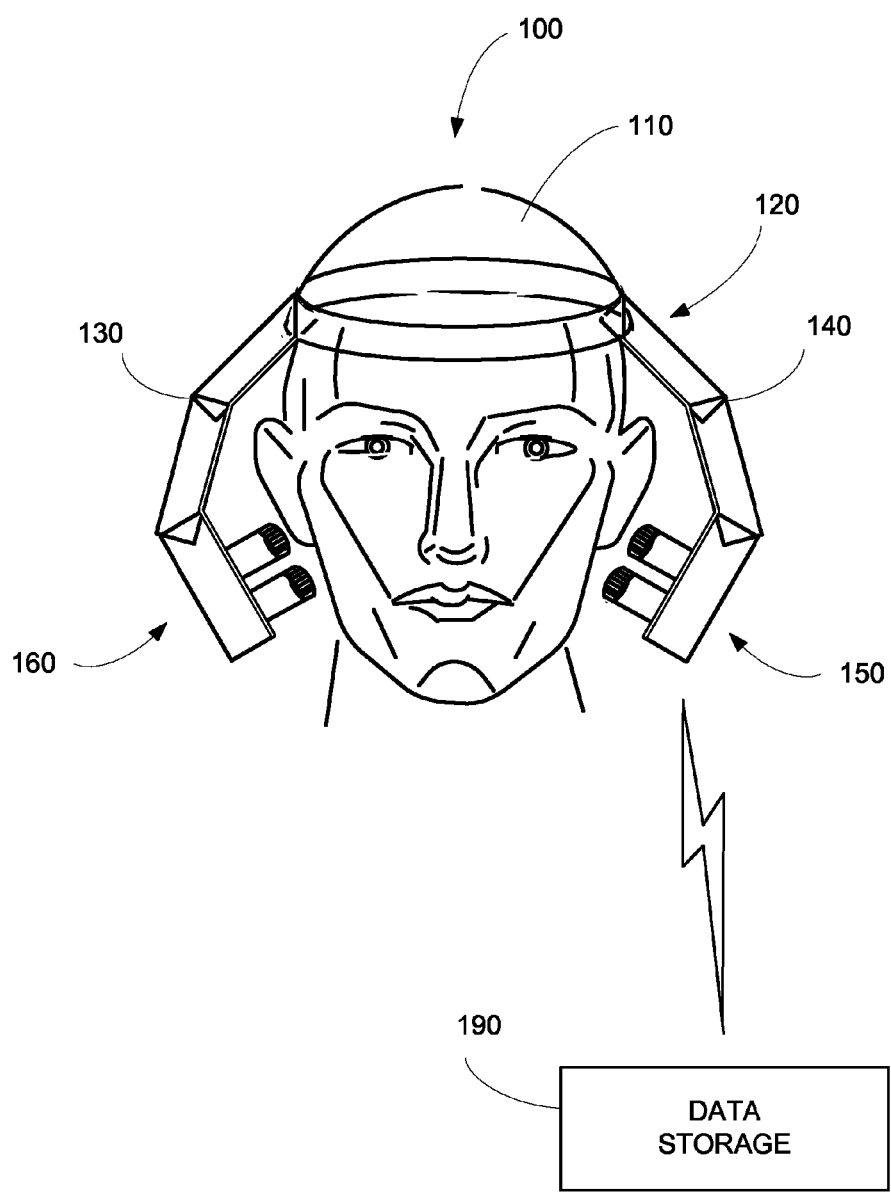
FIG. 1 illustrates a block diagram of various aspects of embodiments of the present invention.

FIG. 1 illustrates a block diagram of various aspects of embodiments of the present invention. More specifically, FIG. 1 illustrates various embodiments of a facial motion capture system.

In the embodiments illustrated in FIG. 1, a motion capture system 100 is used to capture different performances and/or poses of an object 110. In various embodiments of the present invention, object 110 may be a human actor, an animal, or other object capable of assuming different poses often with regards to time. In the example in FIG. 1, object 110 is a human actor, and motion capture system 100 is used to capture poses of the face 120 of the human actor. Merely as examples, the poses may include achieving a smile, achieving a frown, donning a mad expression, performing a wink, flashing a smirk, or the like, as will be discussed below.

In various embodiments, motion capture system 100 includes one or more camera booms 130 and 140. Additionally, each camera boom may include one or more image capture devices 150, 160. In various embodiments of the present invention, image capture devices 150, 160 may include one or more high resolution video cameras (e.g. HD resolution), or the like.

Images captured with image capture devices 150, 160 are stored in a storage unit 190, typically attached to object 110.

In various embodiments, video data from image capture devices 150, 160 may be stored in storage unit 190, that may include a processing unit including a mass storage device (e.g. hard disk, SSD, etc.). Further details and embodiments of motion capture system 100 are described in the co-pending U.S. patent application Ser. No. 12/240,907, filed Sep. 29, 2008, incorporated by reference, for all purposes.

In this example, as the actor, or the like, performs directed facial poses, image capture devices 150, 160 capture images of the actor in different poses from the different vantage points. By tracking positions of markers on the face of the actor in two-dimensions, an animation software model of object 110 may be created in three-dimensions.

Figure 2:
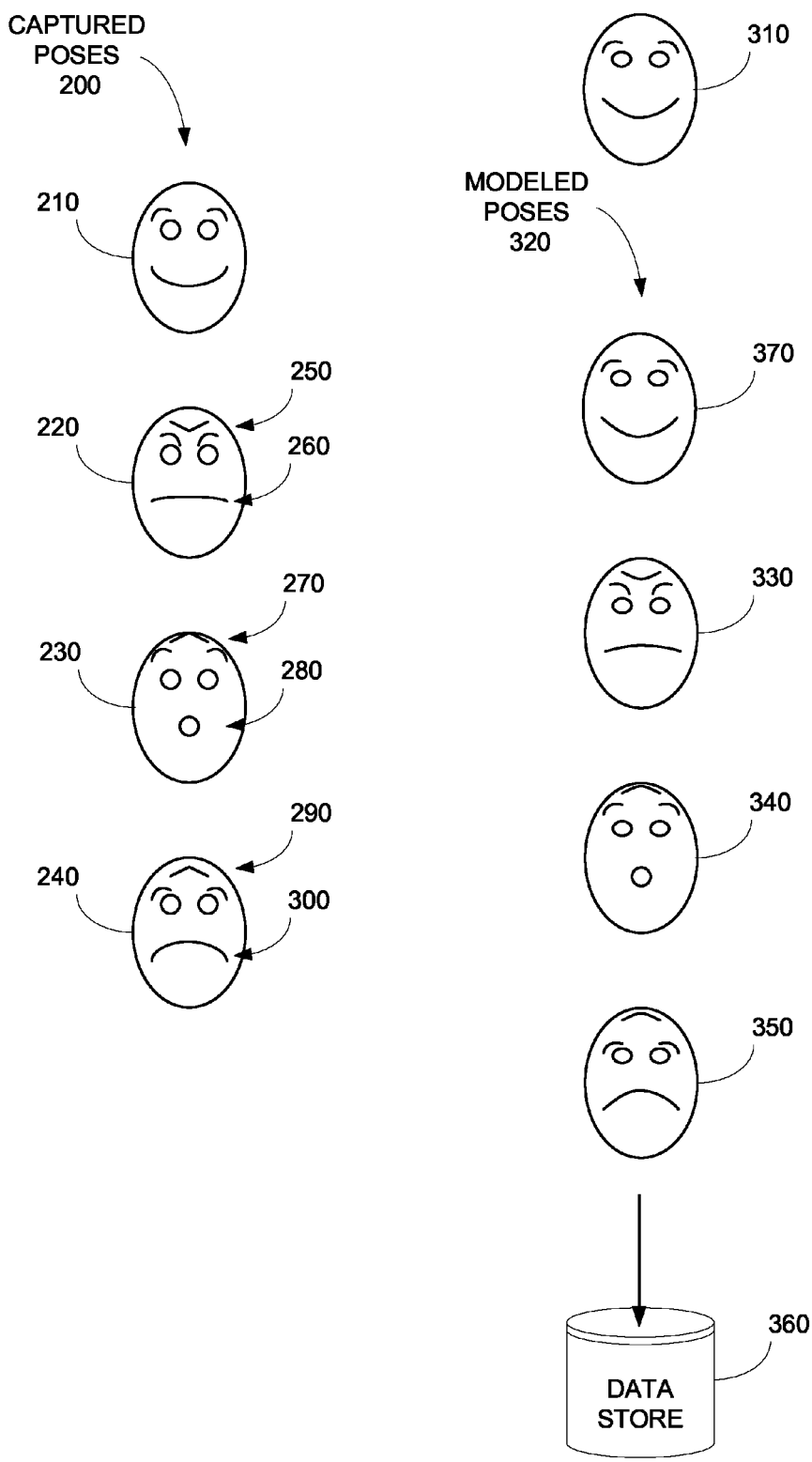
FIG. 2 illustrates an example according to various embodiments of the present invention.

FIG. 2 illustrates an example according to various embodiments of the present invention.

Shown in FIG. 2 are a number of examples of facial poses 200 of an object, e.g. a face of an actor, or other three-dimensional object. In this example, the face of the actor is actor is told to assume any number of facial expressions, for example a relaxed or default expression 210, an angry expression 220, a surprised expression 230, a sad expression 240, and the like. In various embodiments, the number of facial expressions may be on the order of tens of facial expressions, e.g. 10, 20, 50, 80, or greater. As discussed in the co-pending U.S. Patent application, any number of optical marks may be used on the face of the actor to track the position of different portions of the actor's face. In the present examples, it can be seen, that in angry expression 220, the brow is furrowed downwards 250 and the corners of the mouth are pulled downwards 260; in surprised expression 230, the brow is raised 270 and the corners of the mouth are pulled inwards 280; and in sad expression 240, the brow is raised 290, and the corners of the mouth are pulled downwards 300. In various embodiments of the present invention, the number of locations on a face that are optically tracked may be on the order of tens to hundreds, e.g. 50, 200, etc.

As also illustrated in FIG. 2, based upon the tracked movement of portions of the actor's face, an object modeler creates a rigged model 310 of the actor's face for use within an animation environment. In various embodiments, rigged model 310 includes a number of user (e.g. an animator) definable inputs, e.g. animation variable inputs, and model 310 provides a definition of a deformed surface of model 310.

Based upon the values set for the animation variables by an animator, or the like, the object is posed in a particular pose and the surface of the object is deformed. In various embodiments, the surface of model 310 may be represented by a tessellated mesh, or the like, to an animator on a display. As an example of a model of a face may include an animation variable related to the position of an eyelid of the face. In such an example, for an animation variable input of 0.0, the eyelid may be closed; for an animation variable of 1.0, the eyelid may be fully open; etc. If an animator sets both animation variables of the eyelids on a face to 0.3, for example, the object may appear sleepy, sheepish, or the like.

In various embodiments of the present invention, based upon model 310 a user (e.g. an animator) creates one or more modeled poses 320 for model 310 to represent facial poses 200. In particular, the user specifies values for the animation variables such that the deformed surface of model 310 approximates each of facial poses 200. For instance, based upon model 310, an angry modeled pose 330 is determined to be similar to angry expression 220; a surprised modeled pose 340 is determined to represent surprised expression; a sad modeled expression 350 is determined to represent sad expression 240; and the like. In various embodiments, a "neutral" facial pose 370 may also be determined.

In various embodiments, the deformed surfaces and corresponding animation variables values corresponding to each modeled poses 320 and neutral facial pose 370 are typically stored in a database 360. As will be discussed below, the neutral surface and deformed surfaces (along with corresponding animation variables) are stored for later retrieval from database 360.

Figures 3A, 3B, 3C, 3D:
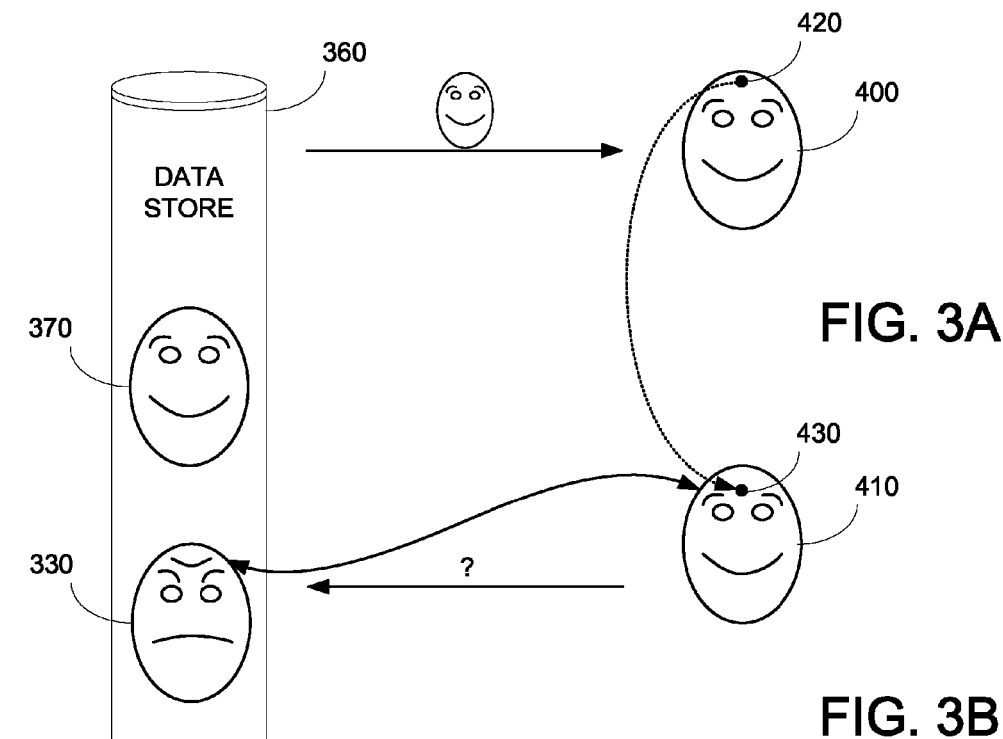
FIGS. 3A-D illustrate examples of various embodiments of the present invention.

FIGS. 3A-B illustrate examples of various embodiments of the present invention. More specifically, FIGS. 3A-B illustrate use of deformed surfaces and corresponding animation variables stored in database 360.

In the Example in FIG. 3A, a user, such as an animator, retrieves a beginning pose 400 for an object, such as neutral facial pose 370 from database 360, on a display within an animation environment. In various embodiments, the surface of the object within the beginning pose may be represented by a mesh, a tessellation, or the like, having any number of vertices that are connected to neighboring vertices. Surfaces may also be represented by curves having control "knots," of the like. In various embodiments, the animation environment may be any conventional or proprietary animation environment, such as Maya (Autodesk), Menv (Pixar), or the like. In other embodiments of the present invention, other poses than a "neutral pose" may also be used during this process. For example, a beginning pose may be an ending pose from a previous animation sequence; the beginning pose may be a preset pose (e.g. angry, happy, sad, or the like); or any other pose.

Next, using any conventional computer user interface device, the user (e.g. animator) may deform the beginning pose. For example, as illustrated in deformed pose 410, the user has selected a point 420 on the forehead of beginning pose 400, and "pulled it down" the face to location 430. In various embodiments, this may be accomplished by selecting a vertex or surface of the mesh, tessellation, or the like of the surface, and dragging the point or geometric feature. In some embodiments, point 420 may be perturbed or modified in two-dimensional space, or three-dimensional space, depending upon the specific requirements. For example, point 420 may be perturbed "up," "down," "left" or "right" along the surface of the object; point 420 may be perturbed "into" or "out" of the surface of the object; or point 420 may be perturbed in any of a combination of directions, described above.

In various embodiments of the present invention, in response to the surface perturbation, the system refers to modeled poses 320 stored in database 360 for a match, FIG. 3B. More specifically, referring to the deformed surfaces of modeled poses 320, the system attempts to determine one or more modeled poses 320 that have point 420 moved to location 430. In the present example, the system determines that the surface of angry modeled pose 33 has a modification in the same manner as point 430, e.g. the center of the forehead of the face is furrowed Accordingly, angry modeled pose 330 is retrieved from database 360 and becomes modeled pose 440, FIG. 3C. This is accomplished, in various embodiments, by retrieving the set of values for the animation variables associated with angry modeled pose 330 from database 360, and applying the retrieved values to rigged object model 310.

In some examples, as illustrated in FIG. 3D, more than one modeled pose may be "matched" based upon the surface perturbation For example, the surface deformations of two or more modeled poses 450 and 460 may match the animator input (e.g. raising a point on the forehead). In such a case, the user, e.g. animator may be prompted to select which modeled pose to use. Based upon the user selection, as discussed above, values for animation variables are then set to the selected modeled pose.

Figure 4A:
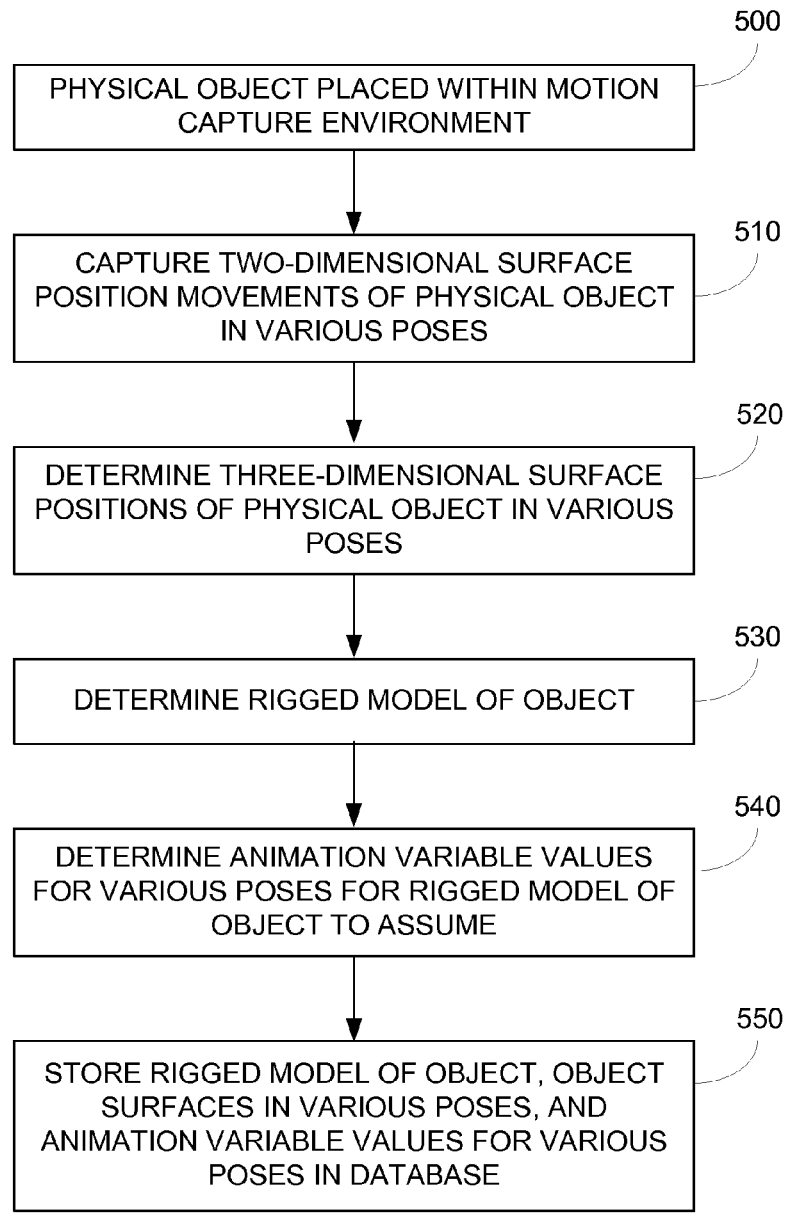
FIGS. 4A-C illustrate a block diagram of a flow chart according to various embodiments of the present invention.
Figure 4B:
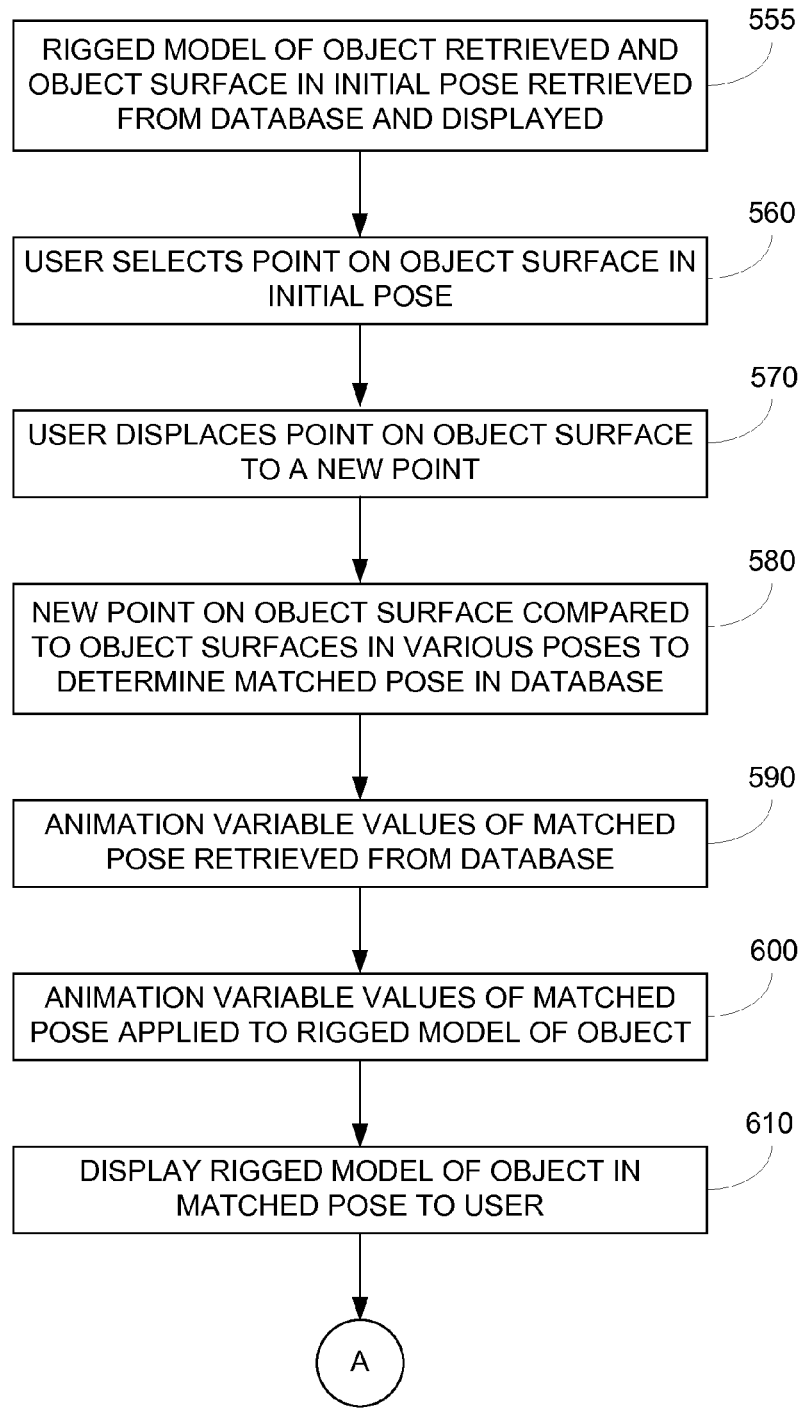
Figure 4C:
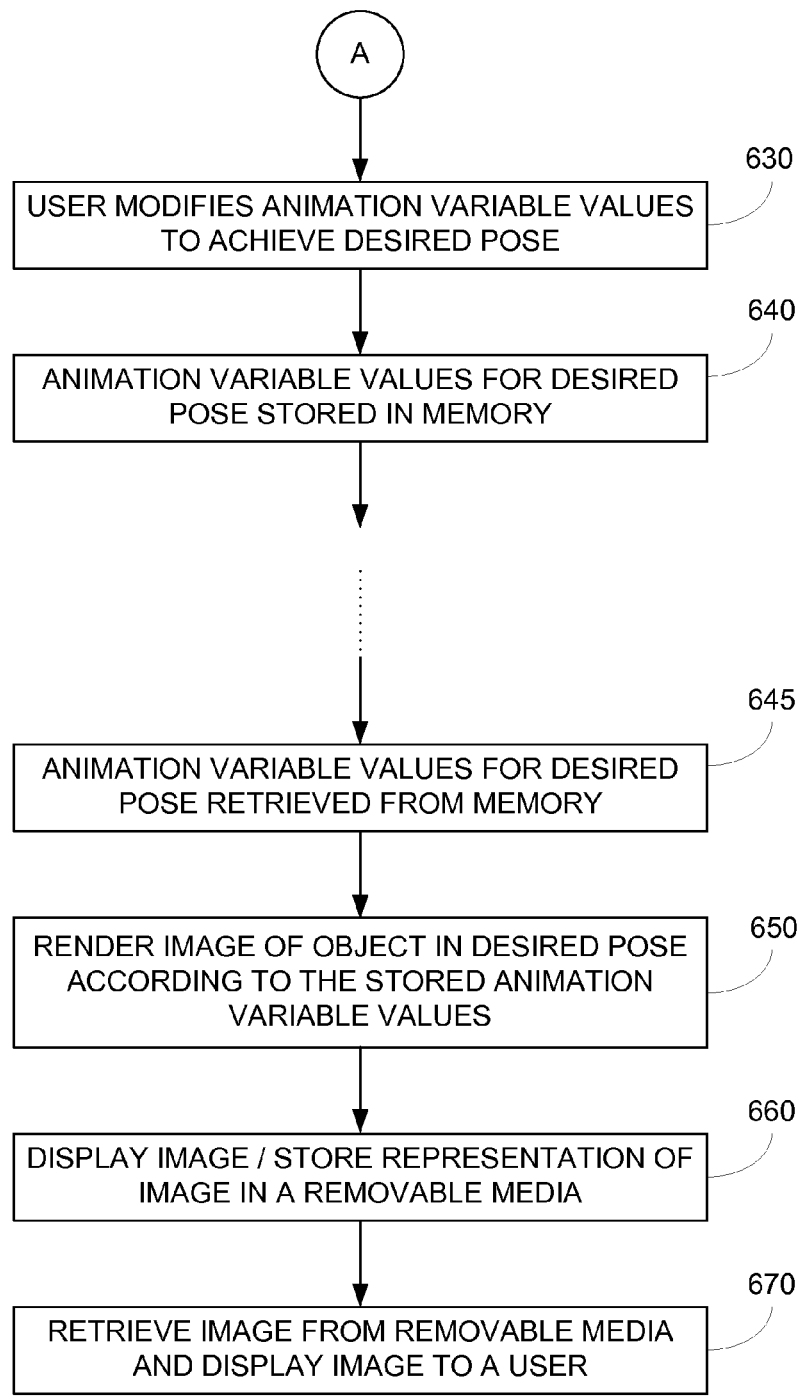

FIG. 4 illustrates a block diagram of a flow chart according to various embodiments of the present invention Initially, an object, such as an actor is placed within a motion capture environment, step 500. In various examples, the object, e.g. human actor, articulated object, animal, or the like is typically equipped with a number of motion capture points, e.g. reflective balls, reflective paints, black dots, etc. and placed within the field of view of a number of motion capture sensors, e.g. visible light cameras, infrared light cameras, or the like. In various embodiments, a portion of the actor in motion, such as the face, the hands, the feet, the body, or the like, may be captured.

Within the motion capture environment, the object assumes characteristic poses, or the object performs a characteristic movement, and the position of the motion capture points are determined, step 510. Based upon the motion capture points, and predefined geometry of the motion capture environment, optics of the motion capture sensors, and the like, the three-dimensional surface positions of the motion capture points are determined for each characteristic pose/performance, step 520.

In various embodiments, based upon the three-dimensional surface positions of the object in the different poses or of the object during the performance, a user, such as an object modeler may determine a model of the object, step 530. In various embodiments, a default model of the object may be a tweaked model of a generic object, may be a model based upon a surface scan of the object, or the like. Additionally, in various embodiments, a user, e.g. a modeler, may also determine any number of animation variables that may be used to modify the surface of the model of the object in response to various user-defined input values.

Next, in various embodiments, the user, e.g. modeler, may define values for the animation variables, such that the model of the object can be approximately posed in the characteristic poses or have approximately the same characteristic movement, step 540. In other words, in various embodiments, the modeler determines modeled poses for the object in order recreate the actual motion-captured motion of the object.

In various embodiments, the values for the animation variables, along with the posed model surfaces are then stored, step 550. For instance a surface descriptor of a happy modeled pose and corresponding animation variable values; a surface descriptor of a sad modeled pose and corresponding animation variable values; or the like, are stored within a data storage, e.g. a database. In various embodiments the posed model surfaces may be represented by a series of surface displacements between a "neutral" pose of the model of the object and the modeled pose. As an example, an angry modeled pose may be characterized by a point on the middle of the forehead of an actor being displaced towards the nose, and points of the outer eyebrows being displaced towards the hairline, thus representing a furrowed brow. Additionally, as an example, the angry modeled pose may be characterized by the corners of the mouth being displaced towards the chin, thus representing a grimaced mouth.

Subsequent to the storing of data to the database, a surface descriptor data and animation variable values of an initial or default pose may be retrieved and displayed, typically, to a different user, e.g. animator, step 555. In various embodiments, the object may be posed in a neutral pose, or any other pose, as determined by the values for the corresponding animation variables. For instance values may be set for animation variables of the model of the object such that the object is posed in a surprised expression, a depressed expression, or the like. As discussed above, in various embodiments, the surface of the object may be represented by a grid mesh, a tessellation, or using any other surface representation scheme, to a user.

As the user views the surface of the posed object, the object may select one or more surface indicator, e.g. vertex, triangle, square, control point or the like, on the surface, step 560. In various embodiments, the user may perform this via a mouse, stylus, or the like. Next, the user moves or displaces the one or more surface indicators in space, step 570. In various examples, the user may move along the surface of the object, into the surface of the object, out of the surface of the object, or any other combination of movement of the selected surface indicator. Accordingly, the movement may be considered within two-dimensional or three-dimensional space.

Next, in various embodiments of the present invention, the system refers to the surface descriptors of the poses stored within the data storage, to determine one or more poses that match the surface deformations or displacements determined in step 570. As described in various embodiments, above, the surface deformations for each modeled pose may be represented by movements of particular surface positions of the object with respect to a default or neutral pose. As examples of the present step, the system may determine a modeled pose that has approximately the same surface deformations as the displacement determined in step 570. As referred to in the example in FIG. 3A, as the user moves point 420 downwards in deformed pose 410, database 360 determines a pose having the same sort of deformation.

In various embodiments, once the modeled pose having the most similar deformation is determined (e.g. pose 440), step 580, the values for the animation variables for the modeled pose are retrieved from data store 360, step 590. In other embodiments, a posed based upon an interpolation of modeled poses may be determined to have the most similar deformations.

Next, in various embodiments, the retrieved values for the animation variables of the modeled pose or of the interpolated modeled pose are applied to the model of the object, step 600, and the modeled pose (or interpolated modeled pose) of the object is displayed to the user, e.g. animator, step 610. In various embodiments, if more than one modeled pose has similar deformations, the user may be prompted to select which modeled pose the model of the object will be used.

Based upon the modeled pose (or interpolated modeled pose) for the object, the user may make further value changes to the animation variables based upon further artistic considerations, or the like, step 630. Once the user is satisfied with the pose of the model of the object for the specific animation frame, the values for the animation frame are recorded to memory, step 640. In various embodiments, the modeled pose with the further changes may be used as a key frame for animation.

Subsequently, the values for the animation variables for the animation frame may be retrieved from memory, step 645, and used for rendering an animation frame including a representation of the object, step 650. This may be done by a different user. In various embodiments, this rendering step may be for pre-production visualization, production rendering, or the like for an animated feature; for display (e.g. for computer gaming); or the like. Representation of rendered images that are determined may be displayed to the user and/or stored in a transportable or removable memory, e.g. hard-disk, optical-disk, film media, or the like, step 660. The rendered images are then retrieved from the memory and displayed to a user (e.g. at a public theater, home theater, computer display, or the like), step 670.

FIG. 5 is a block diagram of typical computer system 700 according to various embodiment of the present invention. In various embodiments, computer system 700 typically includes a monitor 710, computer 720, a keyboard 730, a user input device 740, a network interface 750, and the like.

In the present embodiment, user input device 740 is typically embodied as a computer mouse, a trackball, a track pad, wireless remote, and the like. User input device 740 typically allows a user to select objects, icons, text, control points and the like that appear on the monitor 710. In some embodiments, monitor 710 and user input device 740 may be integrated, such as with a touch screen display or pen based display such as a Cintiq marketed by Wacom. Embodiments of user input devices are illustrated as pedals 745. However, any other such device, such as a joystick, may be used.

Embodiments of network interface 750 typically include an Ethernet card, a modem (telephone, satellite, cable, ISDN), (asynchronous) digital subscriber line (DSL) unit, and the like. Network interface 750 are typically coupled to a computer network as shown. In other embodiments, network interface 750 may be physically integrated on the motherboard of computer 720, may be a software program, such as soft DSL, or the like.

Computer 720 typically includes familiar computer components such as a processor 760, and memory storage devices, such as a random access memory (RAM) 770, disk drives 780, and system bus 790 interconnecting the above components.

In one embodiment, computer 720 is a PC compatible computer having multiple microprocessors such as Xeon™ microprocessor from Intel Corporation. Further, in the present embodiment, computer 720 typically includes a UNIX-based operating system.

RAM 770 and disk drive 780 are examples of tangible media for storage of animation asset data, audio/video files, computer programs, operating system, embodiments of the present invention, including rendering engines, program code, and the like. Other types of tangible media include floppy disks, removable hard disks, optical storage media such as CD-ROMS, DVDs, Blu-Ray disks, semiconductor memories such as flash memories, read-only-memories (ROMS), battery-backed volatile memories, networked storage devices, and the like.

In the present embodiment, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 5 is representative of computer systems capable of embodying the present invention. It will be readily apparent to one of ordinary skill in the art that many other hardware and software configurations are suitable for use with the present invention. For example, the use of other microprocessors are contemplated, such as Core™ or Itanium™ microprocessors; Opteron™ or Phenom™ microprocessors from Advanced Micro Devices, Inc; and the like. Additionally, graphics processing units (GPUs) from NVidia, ATI, or the like, may also be used to accelerate rendering. Further, other types of operating systems are contemplated, such as Windows® operating system such as WindowsVista®, WindowsNT®, or the like from Microsoft Corporation, Solaris from Sun Microsystems, LINUX, UNIX, MAC OS from Apple Corporation, and the like.

In light of the above disclosure, one of ordinary skill in the art would recognize that many variations may be implemented based upon the discussed embodiments. For example, embodiments of the present invention may be directed towards real-time computer animation, such as found in video games. Similar to the process described above, characteristic poses for an object (e.g. facial poses) are determined, modeled, and stored in a database. Next, during gameplay, the player may specify a surface displacement for an object (e.g. petting a virtual animal, touching a virtual patient, or the like). In response, the most appropriate characteristic pose parameters are retrieved, and the object is posed accordingly. In other embodiments, the computer game itself may select the particular pose by specifying a displacement, or the like on the surface. For example, in a warfare-type game, if the left side of a character's face is hit by shrapnel, for example, the system may retrieve a predefined pose where the character's left eye is closed. Then over several frame times, the character's face may achieve the left-eye closed pose.

In other embodiments of the present invention, the deformed surfaces may be applied to other portions of an object that illustrated above, such as: a human hand, a human body, a face of an animal, or the like.

It should be understood that "rendering" may refer to a high quality process of converting an image from a mathematical description of a scene using a program such as Pixar's RenderMan®. Additionally, "rendering" may refer to any graphical visualization of the mathematical description of the scene, or any conversion of geometry to pixels, for example "rendering" with a lower quality rendering engine, or the like, such as GL and GPU hardware and software renderers, and the like. In some embodiments of the present invention, this type of real-time rendering may be used for entertainment programs, such as computer of console gaming. In various embodiments, the rendered object may be incorporated into computer animation, computer generated imagery, into live-action scenes, or the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope.

What is claimed is:

1. A method for a computer system including a processor, a memory, a display, and a user input device comprising:
 receiving at least one surface deformation for a surface of a model of an object via the user input device, wherein the model of the object comprises a plurality of animation variables, wherein values for the plurality of animation variables are used to determine the surface of the model;
 in response to receiving the at least one surface deformation:
  determining, by the processor, a first predefined pose for the model of the object from a plurality of pre-defined poses for the model of the object, wherein a pre-defined pose is based on motion capture data, wherein the first predefined pose comprises a first plurality of values for the plurality of animation variables and a first plurality of surface deformations;
  determining, by the processor, a second predefined pose, wherein the second predefined pose comprises a second plurality of values for the plurality of animation variables and a second plurality of surface deformations,
  determining whether the received at least one surface deformation is more similar to the first plurality of surface deformations associated with the first predefined pose or more similar to the second plurality of surface deformations associated with the second predefined pose;
  in response to determining that the received at least one surface deformation is more similar to the first plurality of surface deformations, posing, by the processor, the model of the object in response to the first plurality of values of the plurality of animation variables;
  in response to determining that the received surface deformation is more similar to the second plurality of surface deformations, posing, by the processor, the model of the object in response to the second plurality of values of the plurality of animation variables; and
  displaying the model of the object on the display.

2. The method of claim 1 further comprising:
 physically posing the object in the first pose;
 determining the physical motion capture data of the surface positions of the object with the processor;
 determining, by the processor, the first plurality of values for the plurality of animation variables in response to the physical motion capture data and in response to user input from the user input device;
 determining a first plurality of surface deformations in the processor in response to the first plurality of values for the plurality of animation variables; and
 determining the first predefined pose in the processor in response to the first plurality of values and in response to the first plurality of surface deformations.

3. The method of claim 1 further comprising:
 receiving a value for an animation variable from the plurality of animation variables from the user via the user input device; and
 wherein posing the model of the object is in response to the first plurality of values of the plurality of animation variables and in response to the value for the animation variable.

4. The method of claim 1 further comprising:
 rendering an image with the processor in response to the model of the object posed in the pose;
 storing a representation of the image in a tangible memory; and
 displaying the image retrieved from the tangible memory to the user on a display;
 wherein the tangible memory is selected from a group consisting of: an optical storage medium, a magnetic storage medium, an electrical storage medium, film medium.

5. The method of claim 1
 wherein the surface of the model of the object comprises a wire-frame model comprising a plurality of vertices; and
 wherein the surface deformation comprises a displacement of at least one vertex from the plurality of vertices.

6. The method of claim 1
 wherein the surface of the model of the object comprises a plurality of control points; and
 wherein the surface deformation comprises a displacement of at least one control point from the plurality of control points.

7. The method of claim 1
wherein determining at least the first predefined pose for the model of the object also comprises determining a second predefined pose for the model of the object stored in the memory in the processor in response to the surface deformation, wherein the second predefined pose comprises a second plurality of values for the plurality of animation variables, wherein the second plurality of values for the plurality of animation variables is determined in response to physical motion capture data of surface positions of the object physically posed in a second pose;
wherein posing the model of the object comprises posing the model of the object in the pose with the processor in response to the first plurality of values of the plurality of animation variables and the second plurality of values of the plurality of animation variables.

8. A computer program product residing on a tangible medium and executable on a computer system including a processor, a user input device and a display, comprising:
code that directs the processor to receive at least one surface deformation for a surface of a model of an object via the user input device, wherein the model of the object comprises a plurality of animation variables, wherein values for the plurality of animation variables are used to determine the surface of the model;
code that directs the processor to, in response to the surface deformation:
determine a first predefined pose for the model of the object from a plurality of pre-defined poses for the model of the object, wherein a pre-defined pose is based on motion capture data, wherein the first predefined pose comprises a first plurality of values for the plurality of animation variables and a first plurality of surface deformations;
determine a second predefined pose, wherein the second predefined pose comprises a second plurality of values for the plurality of animation variables and a second plurality of surface deformations,
determine whether the received at least one surface deformation is more similar to the first plurality of surface deformations associated with the first redefined lose or more similar to the second plurality of surface deformations associated with the second predefined pose;
in response to determining that the received at least one surface deformation is more similar to the first plurality of surface deformations, pose the model of the object in response to the first plurality of values of the plurality of animation variables;
in response to determining that the received surface deformation is more similar to the second plurality of surface deformations, posing, by the processor, the model of the object in response to the second plurality of values of the plurality of animation variables; and
code that directs the processor to display the model of the object in the pose on the display.

9. The computer program product of claim 8 further comprising:
code that directs the processor to determine physical motion capture data of the surface positions of the object while physically posed in the first pose; and
code that directs the processor to determine the first plurality of values for the plurality of animation variables in response to the physical motion capture data and in response to user input from a user input device of the computer system, configured to determine a first plurality of surface deformations in response to the first plurality of values for the plurality of animation variables, and configured to determine the first predefined pose in response to the first plurality of values and in response to the first plurality of surface deformations.

10. The computer program product of claim 8 further comprising:
code that directs the processor to receive a value for an animation variable from the plurality of animation variables from the user via the user input device of the computer system; and
code that directs the processor to pose the model of the object is in response to the first plurality of values of the plurality of animation variables and in response to the value for the animation variable.

11. The computer program product of claim 8 further comprising:
code that directs the processor to render an image in response to the model of the object posed in the pose;
code that directs the processor to store a representation of the image in a tangible memory, wherein the tangible memory is removable from the computer system, and wherein the tangible memory is selected from a group consisting of: an optical storage medium, a magnetic storage medium, an electrical storage medium, film medium.

12. The computer program product of claim 8
wherein the surface of the model of the object comprises a plurality of control points; and
wherein the surface deformation comprises a displacement of at least one control point from the plurality of control points.

13. The computer program product of claim 8 further comprising:
code that directs the processor to determine a second predefined pose for the model of the object from a plurality of pre-defined poses for the model of the object in response to the surface deformation, wherein the second predefined pose comprises a second plurality of values for the plurality of animation variables, wherein the second plurality of values for the plurality of animation variables are determined in response to physical motion capture data of surface positions of the object physically posed in a second pose; and
code that directs the processor to pose the model of the object in a pose in response to the first plurality of values of the plurality of animation variables and to the second plurality of values of the plurality of animation variables.

14. A computer system comprising:
a memory configured to store a model of an object comprising a plurality of animation variables, wherein values for the plurality of animation variables are used to determine a surface of the model of the object, and configured to store a plurality of predefined poses including:
a first predefined pose, wherein a pre-defined pose is based on motion capture data, wherein the first predefined pose comprises a first plurality of values for the plurality of animation variables and a first plurality of surface deformations; and
a second predefined pose, wherein the second predefined pose comprises a second plurality of values for the plurality of animation variables and a second plurality of surface deformations;
a user input device configured to receive an input from the user;

a processor coupled to the memory and to the user input device, wherein the processor is configured to:
  determine at least one surface deformation for the surface of the model of the object in response to the input from the user, wherein the processor is configured to determine whether the received at least one surface deformation is more similar to the first plurality of surface deformations associated with the first predefined pose or more similar to the second plurality of surface deformations associated with the second predefined pose; and
  in response to determining that the received at least one surface deformation is more similar to the first plurality of surface deformations, pose the model of the object in a pose in response to the first plurality of values of the plurality of animation variables; and
  in response to determining that the received surface deformation is more similar to the second plurality of surface deformations, pose the model of the object in a pose in response to the second plurality of values of the plurality of animation variables; and
a display coupled to the processor, wherein the display is configured to display the model of the object.

15. The computer system of claim 14 further comprising:
a motion capture device coupled to the processor, wherein the motion capture device is configured to determine physical motion capture data of the surface positions of the object while physically posed in the first pose; and
wherein the processor is also configured to determine the first plurality of values for the plurality of animation variables in response to the physical motion capture data and in response to user input from a user input device of the computer system, configured to determine a first plurality of surface deformations in response to the first plurality of values for the plurality of animation variables, and configured to determine the first predefined pose in response to the first plurality of values and in response to the first plurality of surface deformations.

16. The computer system of claim 14
wherein the processor is configured to receive a value for an animation variable from the plurality of animation variables from the user, and configured to pose the model of the object is in response to the first plurality of values of the plurality of animation variables and in response to the value for the animation variable.

17. The computer system of claim 14
wherein the plurality of predefined poses includes a second predefined pose, wherein the second predefined pose comprises a second plurality of values for the plurality of animation variables, wherein the second plurality of values for the plurality of animation variables are determined in response to physical motion capture data of surface positions of the object physically posed in a second pose;
wherein the processor is configured to determine the second predefined pose for the model of the object from the plurality of pre-defined poses for the model of the object in response to the surface deformation, and wherein the processor is configured to pose the model of the object in a pose in response to the first plurality of values of the plurality of animation variables and to the second plurality of values of the plurality of animation variables.

* * * * *

UNITED STATES PATENT AND TRADEMARK OFFICE
CERTIFICATE OF CORRECTION

| | | |
|---|---|---|
| PATENT NO. | : 8,896,607 B1 | Page 1 of 1 |
| APPLICATION NO. | : 12/475268 | |
| DATED | : November 25, 2014 | |
| INVENTOR(S) | : Doug Epps and Nate Reid | |

It is certified that error appears in the above-identified patent and that said Letters Patent is hereby corrected as shown below:

In the Claims

In claim 8, column 11, line 42-43,
delete "redefined lose;" and insert --predefined pose;-- so the lines read as "surface deformations associated with the first predefined pose or more similar to the second plurality of"

Signed and Sealed this
Seventeenth Day of March, 2015

Michelle K. Lee
*Director of the United States Patent and Trademark Office*